(12) United States Patent
Mahatme et al.

(10) Patent No.: US 11,056,161 B2
(45) Date of Patent: Jul. 6, 2021

(54) DATA PROCESSING SYSTEM AND METHOD FOR GENERATING A DIGITAL CODE WITH A PHYSICALLY UNCLONABLE FUNCTION

(71) Applicant: NXP USA, INC., Austin, TX (US)

(72) Inventors: Nihaar N. Mahatme, Austin, TX (US); Alexander Hoefler, Austin, TX (US); Brad John Garni, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/523,284

(22) Filed: Jul. 26, 2019

(65) Prior Publication Data

US 2021/0027814 A1  Jan. 28, 2021

(51) Int. Cl.
*G11C 7/04* (2006.01)
*G11C 7/12* (2006.01)
*G11C 11/419* (2006.01)
*G11C 7/18* (2006.01)
*H04L 9/32* (2006.01)
*G11C 11/418* (2006.01)

(52) U.S. Cl.
CPC .......... *G11C 7/12* (2013.01); *G11C 7/18* (2013.01); *G11C 11/418* (2013.01); *G11C 11/419* (2013.01); *H04L 9/3278* (2013.01); *H04L 2209/125* (2013.01)

(58) Field of Classification Search
CPC .................................................. G11C 7/062
USPC ................................................... 365/207
See application file for complete search history.

(56) References Cited

U.S. PATENT DOCUMENTS

| 8,848,477 | B2 | 9/2014 | Schrijen et al. |
| 9,786,362 | B1 * | 10/2017 | Das .................... G11C 11/413 |
| 9,947,391 | B1 * | 4/2018 | Mahatme ............. G11C 7/24 |
| 10,574,469 | B1 * | 2/2020 | Garni ................ G06F 3/0653 |
| 2016/0065379 | A1 * | 3/2016 | Holcomb ............ G09C 1/00 713/189 |
| 2018/0102163 | A1 * | 4/2018 | Lin .................... H04L 9/3278 |

(Continued)

OTHER PUBLICATIONS

Claes, Mathias, et al.; "Comparison of SRAM and FF PUF in 65nm Technology;" Information Security Technology for Applications (Peeter Laud, ed.), Lecture Notes in Computer Science, vol. 7161, Springer Berlin / Heidelberg, 2012, pp. 47-64.

(Continued)

*Primary Examiner* — Hoai V Ho
(74) *Attorney, Agent, or Firm* — Daniel D. Hill

(57) ABSTRACT

A data processing system and method for generating a digital code for use as a physically unclonable function (PUF) response is provided. The method includes activating a plurality of word lines for a read operation. A first bit line is coupled to a first input of a comparator during the read operation. A second bit line is coupled to a second input of the comparator during the read operation. A current is generated on each of the first and second bit lines. The currents on the first and second bit lines are converted to voltages. The voltage on the first bit line is compared to the voltage on the second bit line. A logic bit is output from the comparator as part of the digital code, a logic state of the logic bit is determined in response to the comparison. By selecting multiple word lines to determine a PUF response, noise immunity is improved.

18 Claims, 6 Drawing Sheets

(56) References Cited

U.S. PATENT DOCUMENTS

2020/0135266 A1\* 4/2020 Kumar .................... G11C 7/12
2020/0192753 A1\* 6/2020 Akerib ................ G06F 11/1016

OTHER PUBLICATIONS

Schrijen, Geert-Jan et al.; "Comparative Analysis of SRAM Memories Used as PUF Primitives;" Proceedings of the Conference on Design, Automation and Test in Europe, pp. 1319-1324. EDA Consortium; Dresden, Germany; Mar. 12-16, 2012.

Selimis, Georgios, et al.; "Evaluation of 90nm 6T-SRAM as Physical Unclonable Function for Secure Key Generation in Wireless Sensor Nodes;" 2011 IEEE International Symposium of Circuits and Systems (ISCAS); May 15-18, 2011; Rio de Janeiro, Brazil; DOI: 10.1109/ISCAS.2011.5937628.

Suh, G. Edward, et al.; "Physical Unclonable Functions for Device Authentication and Secret Key Generation;" 2007 44th ACM/IEEE Design Automation Conference; Jun. 4-8, 2007; San Diego, California.

U.S. Appl. No. 16/260,751; Inventor, Mahatme, Nihaar N. et al.; "SRAM Based Physically Unclonable Function and Method for Generating a PUF Response;" filed Jan. 29, 2019.

\* cited by examiner

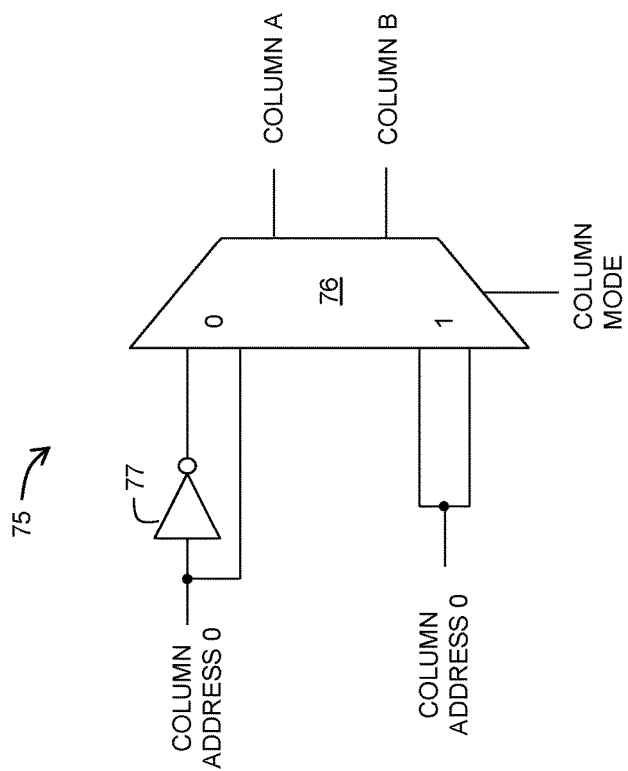
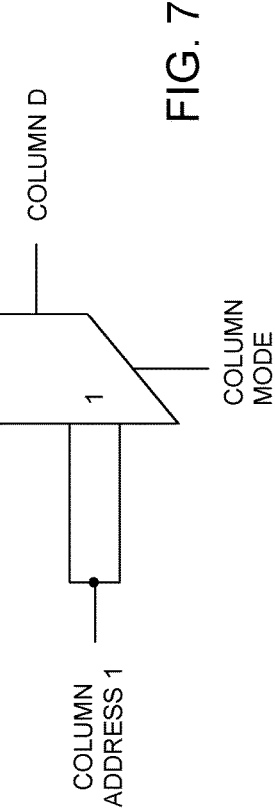
FIG. 7
FIG. 8

DATA PROCESSING SYSTEM AND METHOD FOR GENERATING A DIGITAL CODE WITH A PHYSICALLY UNCLONABLE FUNCTION

BACKGROUND

Field

This disclosure relates generally to electronic circuits and more specifically to a data processing system and method for generating a digital code with a physically unclonable function (PUF).

Related Art

A physically unclonable function (PUF) is a physical system that will produce an unpredictable response when a stimulus is input. One example of a PUF uses the power-up state of a static random-access memory (SRAM). However, manufacturing variations, temperature, power supply, switching noise, device aging, and other factors may cause some of the cells of the PUF to power-up in different states at different times. Because no two integrated circuits are exactly alike, the output of the PUF is difficult to predict, and therefore difficult to recreate. This makes the PUF useful for storing unique information about the IC. For example, the PUF may be used to generate a digital signature or encryption/decryption key. To use the PUF, a certain challenge may be provided to the SRAM and the SRAM provides the response. However, only one digital code can be generated from the power-up state of an SRAM array, and the challenge may require multiple responses.

Therefore, a need exists for a way to implement a PUF and to provide a digital code using the PUF that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 7 illustrates a portion of a bit line selection circuit in accordance with an embodiment.

FIG. 8 is a table of values of the bit line selection circuit of FIG. 7.

DETAILED DESCRIPTION

Figure 1:
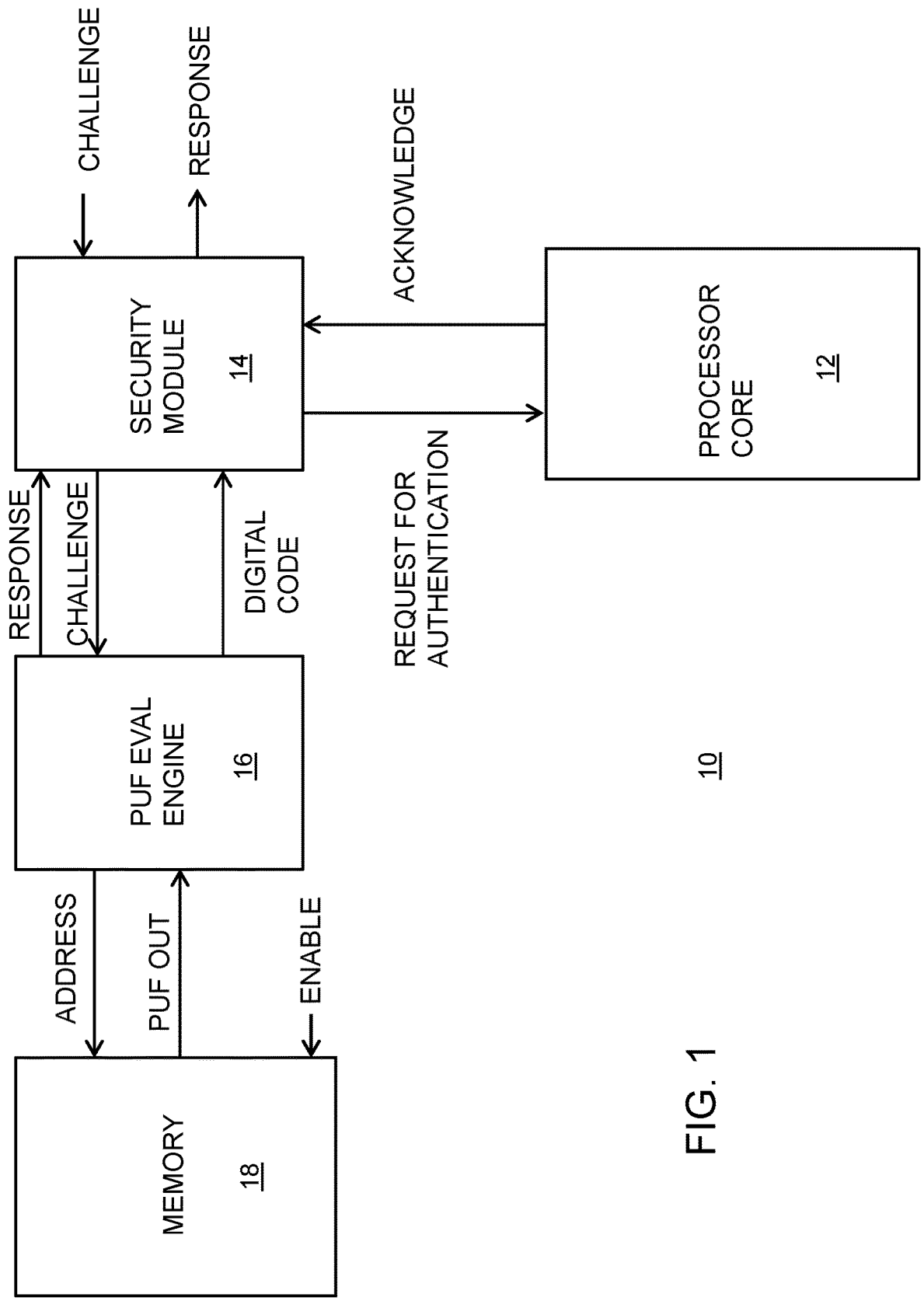
FIG. 1 illustrates a system in accordance with an embodiment.

Generally, there is provided, a data processing system and a method for generating a digital code with a PUF. The PUF is implemented as an array of memory cells coupled to bit lines and word lines. A read operation of a memory array used as a PUF in accordance with the disclosed embodiment is different than a normal random-access memory read operation. When reading the digital code from the memory array, a plurality of word lines is activated at the same time so that multiple memory cells are connected to each of the bit lines during the read operation. A word line driver multiplexer is provided to selectively activate the multiple word lines in response to a row address. An activated word line connects the memory cells of a row to corresponding bit lines. In one embodiment, two word lines are activated at the same time so that two bit cells, one bit cell from each row, provide their current to each selected bit line. In another embodiment, the number of selected word lines may be different. To prepare the array of memory cells to be read, a predetermined logic state is first written to each of the memory cells. Then, during the read operation, a first bit line is connected to a first input of a comparator, and a second bit line is connected to a second input of the comparator. The bit lines may be selected using a bit line selection circuit that receives a column address. During an evaluation of the bit line currents using the comparator, a read current of one of the bit lines is compared to a read current of another bit line to determine one output logic state. A signal representing the logic state is provided by the comparator. The logic state of the signal is used to generate one bit of a digital code. In another embodiment, multiple bit lines may be connected together at each input of the comparator during the read operation. The bit line selection circuit may select bit lines that are adjacent to each other or the selected bit lines may be from different parts of the array, or from different arrays. In one embodiment, the memory array includes a plurality of static random-access memory cells. The resulting digital code may be used to provide a cryptographic key or signature for the data processing system.

Implementing a PUF array and a method for reading a PUF array with multiple word line selection and/or multiple bit line selection to connect multiple memory cells to the bit lines provides a greater signal difference to the comparator and thus, better noise immunity. Depending on the comparator implementation, the signal difference could be a voltage difference, a current difference, a capacitive difference, or other electrical signal difference. Also, by providing the ability to select multiple bit lines and multiple word lines for a read operation provides a PUF array of a given size with more responses to select from, thus increasing the challenge-response space.

In one embodiment, there is provided, a method for generating a digital code, the method including: activating a plurality of word lines in a memory array for a read operation, wherein the memory array includes a plurality of bit lines intersecting with the plurality of word lines, a bit cell of a plurality of bit cells being located at each intersection of the plurality of word lines and the plurality of bit lines; coupling a first bit line of the memory array to a first input of a comparator during the read operation; coupling a second bit line of the memory array to a second input of the comparator during the read operation; generating a signal on each of the first and second bit lines; comparing the signal on the first bit line to the signal on the second bit line; and outputting a logic bit from the comparator as part of the digital code, a logic state of the logic bit determined in response to the comparison. The memory array may include a physically unclonable function (PUF), and the step of outputting the logic bit may be a PUF response. The memory array may be characterized as being a static random-access memory array. Activating the plurality of word lines may further include enabling a decoder to select the plurality of word lines at the same time for the read operation. Coupling the first and second bit lines may further include coupling a third bit line to the first bit line and coupling a fourth bit line to the second bit line. Each of the first and second bit lines may be one bit line of a bit line pair. The method may be performed using an integrated circuit memory array. The method may further include writing a predetermined logic state to all of the plurality of bit cells before the read operation. Activating the plurality of word lines may further include enabling a word line driver multiplexer to activate two word lines at the same time during the read operation.

In another embodiment, there is provided, in a memory array comprising a plurality of memory cells organized as intersecting rows and columns, where a row includes a word line and all the memory cells coupled to the word line, and a column includes a bit line and all the memory cells coupled to the bit line, a method for generating a digital code, the method including: writing a predetermined logic state to all the plurality of memory cells; activating a plurality of word lines in the memory array for a read operation; coupling a first bit line of the memory array to a first input of a comparator during the read operation; coupling a second bit line of the memory array to a second input of the comparator during the read operation; generating a current on each of the first and second bit lines; converting the currents on the first and second bit lines to voltages; using the comparator, comparing the voltage on the first bit line to the voltage on the second bit line; and outputting a logic bit from the comparator as part of the digital code, a logic state of the logic bit determined in response to the comparison. The plurality of memory cells may be characterized as being a plurality of static random-access memory cells. The digital code may be used as a physically unclonable function (PUF) response. Coupling the first and second bit lines may further include coupling a third bit line to the first bit line and coupling a fourth bit line to the second bit line. The memory array may be implemented on an integrated circuit. The method may further include coupling the plurality of bit lines to a bit line selection circuit, the bit line selection circuit for coupling a predetermined number of bit lines together in response to a mode signal.

In another embodiment, there is provided, a data processing system including: a processor; a memory array coupled to the processor, the memory array including a plurality of memory cells, a plurality of word lines, and a plurality of bit lines intersecting the plurality of word lines, wherein a memory cell of the plurality of memory cells is located at each intersection of the plurality of word lines and the plurality of bit lines; a word line driver multiplexer coupled to the plurality of word lines, the word line driver multiplexer selecting at least two word lines for a read operation in response to a row address; a bit line selection circuit coupled to the plurality of bit lines, the bit line selection circuit for selecting a first bit line and a second bit line in response to a column address; and a comparator for comparing a difference between a signal generated on each of the first and second bit lines, and the comparator for outputting a logic state representative of the difference. The bit line selection circuit may further include a mode for coupling a third bit line to the first bit line and coupling a fourth bit line to the second bit line. The data processing system may be implemented on one or more integrated circuit devices. The outputted logic state may be part of a physically unclonable function (PUF) response. The plurality of memory cells may be a plurality of static random-access memory cells.

FIG. 1 illustrates a data processing system 10 in accordance with an embodiment. Data processing system 10 includes processor core 12, security module 14, PUF evaluation engine 16, and memory 18. Processor core 12 can be any kind of processor core, or a plurality of cores, for executing instructions. Processor core 12 is connected to security module 14 to provide an acknowledge signal ACKNOWLEDGE when a request for authentication (REQUEST FOR AUTHENTICATION) is provided by security module 14. Security module 14 provides the REQUEST FOR AUTHENTICATION in response to receiving a challenge signal (CHALLENGE) from a requestor (not shown). PUF evaluation engine 16 may provide a response signal (RESPONSE) in response to the CHALLENGE. To get the RESPONSE, PUF evaluation engine 16 provides an address (ADDRESS) to read memory 18. In response to the address, memory 18 provides a PUF response labeled "PUF OUT" from a memory array back to PUF evaluation engine 16. The PUF OUT signals are logic states of selected memory cells of the memory array from which PUF evaluation engine 16 evaluates and generates a digital code (DIGITAL CODE). The digital code is provided to security module 14 and used by security module 14 to generate a unique chip ID, encryption/decryption key, digital signature, or the like as a response (RESPONSE) to the requestor. Data processing system 10 may also include other circuits and modules not illustrated in FIG. 1. For example, data processing system 10 may include input/output circuits, memory, analog-to-digital converters, phase-locked loops, and the like, depending on the application.

Figure 2:
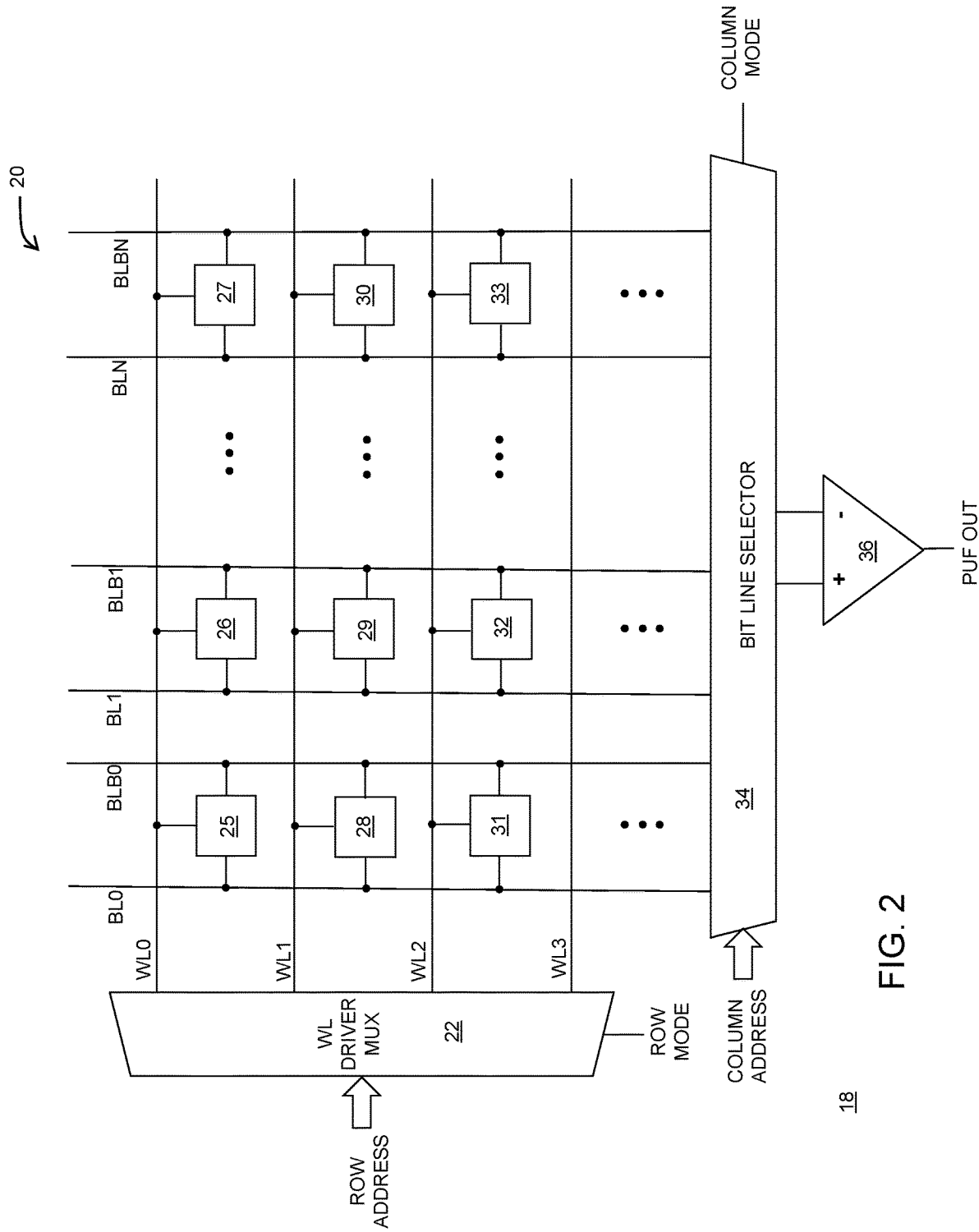
FIG. 2 illustrates the memory of FIG. 1 in accordance with an embodiment.

FIG. 2 illustrates memory 18 of FIG. 1 in accordance with an embodiment. Memory 18 is a static random-access memory (SRAM). In another embodiment, memory 18 may be another type of volatile or non-volatile memory. Memory 18 includes memory array 20, word line driver multiplexer 22, representative memory cells 25-33, bit line selector 34, and comparator 36. In the illustrated embodiment, a column includes a bit line pair and all the SRAM cells connected to the bit line pair. A row includes a word line and all the SRAM cells connected to the word line. The rows and columns intersect so that a memory cell is coupled to a word line and a bit line pair at the intersections. Note that references to bit cell, memory cell, SRAM cell, or the like, are different references to the same storage cell for storing a logic bit. Also, in other embodiments, the memory organization may be different.

Figures 5, 6:
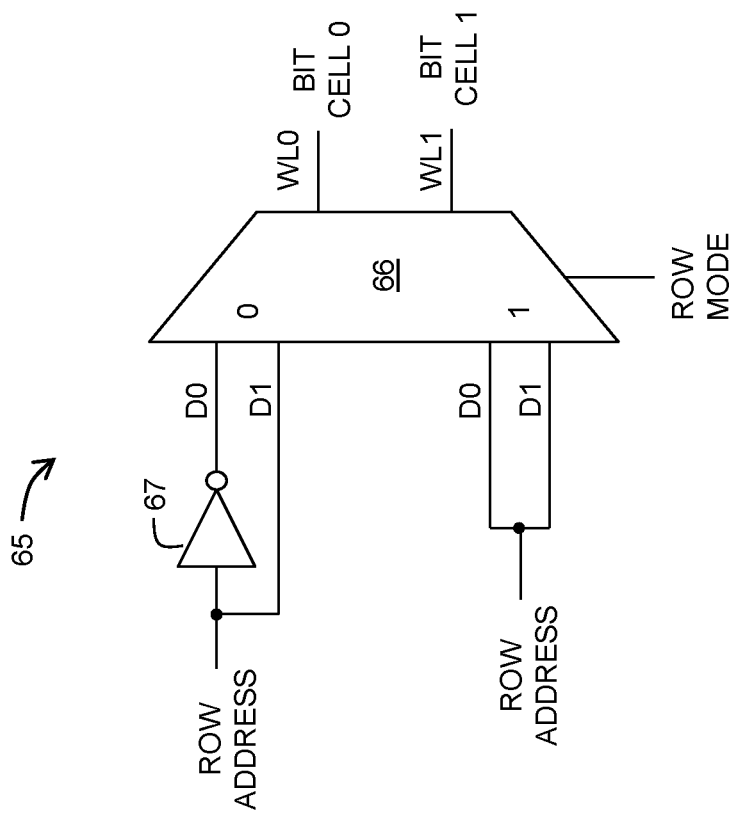
FIG. 5 illustrates a decoder for selecting multiple word lines in accordance with an embodiment.
FIG. 6 is a table of values of the decoder of FIG. 5.

Word line driver multiplexer 22 has a plurality of inputs for receiving a row address, and an input for receiving a mode signal labeled "ROW MODE." In response to the row address, one or more word lines labeled "WL0-WL3" are selected and activated depending on the state of mode signal ROW MODE. An embodiment of word line driver multiplexer 22 for selecting multiple word lines is illustrated in FIG. 5. When activated, the one or more word lines selected by the row address cause the memory cells associated with the word line to be connected to the bit lines. Coupling multiple bit cells to a bit line at the same time provides a higher discharge current on the bit line.

In an SRAM array, such as array 20, each of memory cells 25-33 is connected to a pair of bit lines. In memory array 20, the bit line pairs are labeled "BL0/BLB0" to "BLN/BLBN" where N is an integer and each bit line BLB is a logical complement of each corresponding bit line BL to make up the bit line pairs. The memory array can have any number of memory cells. As can be seen in FIG. 2, the bit line pairs intersect with the word lines and the memory cells are located at the intersections of the bit line pairs and word lines. The organization may be different in different embodiments.

Each of the bit line pairs are connected to bit line selector 34. Bit line selector 34 has inputs for receiving a column address labeled "COLUMN ADDRESS", an input for receiving mode signal "COLUMN MODE", and first and second outputs. The first and second outputs are connected to inputs of comparator 36. In one operating mode, bit line selector 34 connects one bit line BL to each of the two inputs of comparator 36. In another operating mode, bit line selector 34 connects two or more bit lines to each input of comparator 36. As an example, during a read operation, assume word line driver multiplexer 22 selects two word lines WL0 and WL1 to be activated. Bit line selector 34 connects a bit line, such as bit line BL0 to the plus (+) input of comparator 36, and another bit line, such as bit line BLN to the minus (−) input of comparator 36. Note that the complementary bit lines BLB0 and BLBN are not used. The selected word lines cause bit cells 25 and 28 to be connected to bit line BL0 and bit cells 27 and 30 to be connected to bit line BLN. In response to being connected to two bit lines, comparator 36 compares a voltage generated from current provided by bit cells 25 and 28 on bit line BL0 to a voltage generated from current provided by bit cells 27 and 30 on bit line BLN. In response, comparator 36 provides a logic bit labeled PUF OUT. In another mode of operation, during a PUF read operation, bit line selector 34 selects more than one bit line to connect to each input of comparator 36. That is, the bit cells selected by the word lines of more than one bit line are connected to each input of comparator 36. Note that only the true bit lines of the bit line pairs are used to generate a PUF digital code. In another embodiment, the complementary bit lines may be used instead of the true bit lines. Alternately, a combination of both true and complementary bit lines may be used instead of one or the other of the true bit lines or the complementary bit lines.

Figure 3:
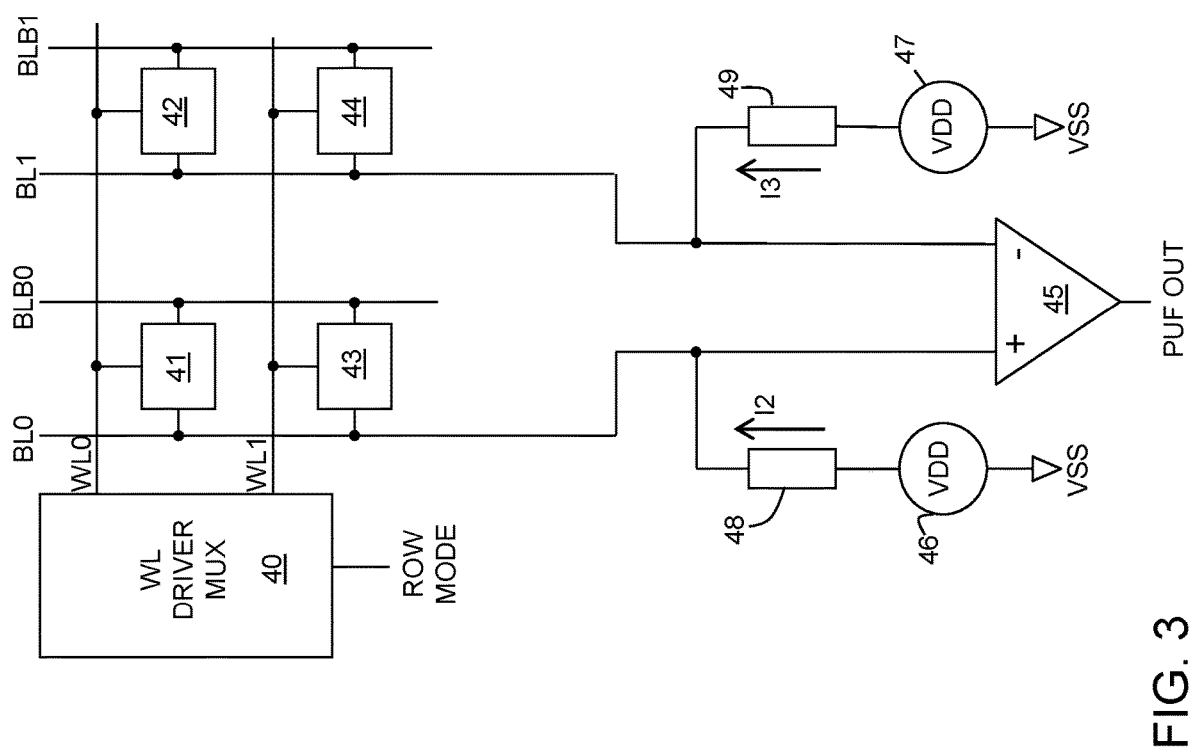
FIG. 3 illustrates circuit portions useful for describing the generation a PUF response using an SRAM array in accordance with an embodiment.

FIG. 3 illustrates circuit portions useful for describing the generation of a PUF response using a memory array in accordance with an embodiment. For illustration purposes, the array has two word lines WL0 and WL1 crossing two bit line pairs BL0/BLB0 and BL1/BLB1. The two word lines WL0 and WL1 are connected to word line driver multiplexer 40, where word line WL0 is connected to bit cells 41 and 42 and word line WL1 is connected to bit cells 43 and 44. Likewise, the two bit cells 41 and 43 are connected to bit line pair BL0/BLB0 and the two bit cells 42 and 44 are connected to bit line pair BL1/BLB1. Also, illustrated in FIG. 3 are word line driver multiplexer 40, voltage sources 46 and 47, resistive elements 48 and 49, and analog comparator 45. Voltage sources 46 and 47 provide substantially the same voltages labeled "VDD", and resistive elements 48 and 49 provide substantially the same resistances. Note that a bit line selection circuit is not shown in FIG. 3.

Comparator 45 has a first input connected to bit line BL0, and a second input connected to bit line BL1, each connected through a bit line selection circuit (not shown) such as bit line selector 34 in FIG. 2. Note that the bit line selection circuit can couple any pair of the true bit lines to the inputs of comparator 45. In another embodiment, the complement bit lines may be used instead of the true bit lines. Alternately, a combination of true and complementary bit lines may be used instead of one or the other of both the true bit lines and complementary bit lines. An output of comparator 45 provides PUF response PUF OUT in response to a detected voltage difference. The true bit lines from each bit line pair of the PUF are connected to inputs of a comparator so that the selected SRAM cells are employed to generate one bit of the PUF response. As can be seen in FIG. 3, the complementary bit lines BLBs remain unconnected and are not used to produce the PUF response. A resistive element 48 has a first terminal connected to bit line BL0, and a second terminal. Resistive element 48 is shown with a current I2. Voltage source 46 has a first terminal connected to the second terminal of resistive element 48, and a second terminal connected to VSS, or ground. Resistive element 49 has a first terminal connected to bit line BL1, and a second terminal. Resistive element 49 is shown with a current I3. Voltage source 47 has a first terminal connected to the second terminal of resistive element 49, and a second terminal connected to VSS, or ground.

Figure 4:
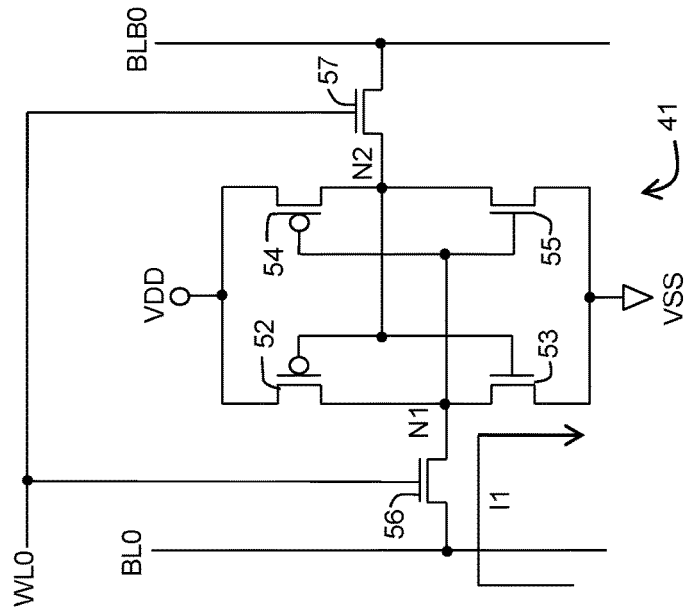
FIG. 4 illustrates a bit cell of the memory of FIG. 3 in more detail.

FIG. 4 shows details of an embodiment of SRAM bit cell 41 of FIG. 3 as well as the connections of bit cell 41 to a word line WL and bit line pair. Bit cell 41 is a conventional six-transistor SRAM bit cell and includes P-channel transistors 52 and 54 and N-channel transistors 53, 55, 56, and 57. Transistors 52, 53, 54, and 55 are connected to form a cross-coupled latch, and transistors 56 and 57 are provided to selectively connect storage nodes N1 and N2 of the cross-coupled latch to bit line pair BL0 and BLB0. The cross-coupled inverters are connected between power supply voltage terminal VDD and ground terminal VSS. The transistors may be implemented using any appropriate conventional complementary metal-oxide semiconductor (CMOS) process. As can be seen in FIG. 4, when word line WL0 is asserted as a logic high voltage, N-channel transistors 56 and 57 are conductive, coupling the cross-coupled latch to bit line pair BL0 and BLB0. A conductive path is formed from each bit line through each of transistors 56 and 57 to each storage node N1 and N2, through transistor 53, and to VSS as indicated by the current labeled "I1".

In an SRAM array being used to provide a PUF response according to the disclosed embodiment, a predetermined logic state is first written to all of the bit cells used to provide the PUF response. In one embodiment, in preparation for reading a PUF response, a logic zero is written to each of the bit cells so that each storage node N1 (FIG. 4) stores a logic low voltage. All the true bit lines are precharged to a logic high voltage. After the bit lines are precharged, the described embodiment allows for multiple word lines to be selected at the same time. The word line driver multiplexer 40 includes a mode select control signal ROW MODE that is used to select the number of word lines turned on during a read operation. Assume in FIG. 3 that both word lines WL0 and WL1 are activated to select bit cells 41 and 43 to connect to bit line BL0 and bit cells 42 and 44 to connect to bit line BL1. Regarding bit line BL0, both selected bit cells 41 and 43 provide a current like current I1 as shown in FIG. 4. Also, selected bit cells 42 and 44 provide a current like current I1 to bit line BL1. Currents I2 and I3 cause a voltage drop across resistive elements 48 and 49 at the inputs of comparator 45. Because of various factors including process variations, the currents are not exactly the same. Voltage sources 46 and 47 and resistive elements 48 and 49 should be relatively closely matched to each other so that the compared current differences come primarily from differences in the cells. The difference currents between the individual bit cells may be very small. Also, using matched bit lines would reduce any bit line offset. Connecting multiple bit cells to the bit lines as provided increases the difference current to make sensing the difference more robust. Comparator 45 determines the difference between the two voltage drops and provides a logic high or logic low voltage signal PUF OUT to PUF evaluation engine 16 (FIG. 1).

When cell currents from individual bit cells being compared are very close to each other, the sensitivity of the comparator is very important. By activating multiple word lines to connect multiple memory cells to the bit lines during a read operation, the bit cell currents on the bit lines increase. Also, the difference between the sensed current values increases. This provides better noise immunity as compared to a PUF array that does not connect multiple memory cells to the bit lines to generate a PUF response. Also, the PUF is less susceptible to misprediction due to marginal comparator sensitivity. In addition, a comparator design can be traded off against noise immunity, because as the offset current becomes higher the comparator becomes more robust to misprediction. This can also be used to reduce the area of the comparator or the offset voltage specification to reduce design complexity.

FIG. 5 illustrates a simplified embodiment of a decoder 65 for use in word line driver multiplexers 22 and 40 for selecting one or more word lines for a PUF read operation. Decoder 65 includes multiplexer 66 and inverter 67. Multiplexer 66 includes inputs labeled D0 and D1, a control input for receiving mode signal ROW MODE, and outputs labeled WL0 and WL1. Word line WL0 is connected to a bit cell BIT CELL 0 and word line WL1 is connected to a bit cell BIT CELL 1. Mode signal ROW MODE can be asserted as a logic zero "0" for selecting a single word line for a read operation, or a logic one "1" for selecting two word lines for a PUF read operation.

FIG. 6 is a table illustrating the possible states of the decoder of FIG. 5. When mode signal ROW MODE is a logic zero, as shown in the top two rows of the table of FIG. 6, the top inputs D0 and D1 are selected. Therefore, if ROW ADDRESS is a logic zero, D1 is a logic zero and inverter 67 provides D0 as a logic one. The logic one D0 selects WL0 and a BIT CELL 0. If ROW ADDRESS is a logic one, inverter 67 provides D0 as a logic zero, while D1 is a logic one, thus selecting word line WL1 and a BIT CELL 1. When mode signal is a logic one, the bottom two rows of the table of FIG. 6 apply, and the bottom two inputs of multiplexer 66 are selected. If ROW ADDRESS is a logic zero, both inputs D0 and D1 are passed through multiplexer 66 and output as logic zero word line voltages with no word lines selected. If ROW ADDRESS is a logic one, both input D0 and D1 are passed through as logic high voltages, and both word lines WL0 and WL1 are asserted and thus both bit cells BIT CELL 0 and BIT CELL 1 are selected. Decoder 65 is only one embodiment; other embodiments of a decoder for selecting multiple word lines are possible. Also, decoder 65 may be extended to a multi-level decoder structure. For example, for four addresses A0, A1, A2, and A3, there are six combinations possible: A0A1, A0A2, A0A3, A1A2, A1A3, and A2A3. Decoder 65 allows for more than one combination of addresses to be selected as well.

FIG. 7 illustrates a bit line selection circuit 75 for selecting one or more columns for comparison in accordance with an embodiment. Bit line selection circuit 75 is for use in bit line selection circuit 34 of FIG. 2. Bit line selection circuit 75 includes multiplexers 76 and 79 and inverters 77 and 78. Each multiplexer is responsible for selecting a bit line for one input of a comparator. Specifically, bit line selection circuit 75 selects one or both of COLUMN A and COLUMN B to be compared with one or both of COLUMN C and COLUMN D. Each multiplexer 76 and 79 operates similarly to multiplexer 66 in FIG. 5. As a simplified example, multiplexer 76 includes inputs for receiving address COLUMN ADDRESS 0, a control input for receiving mode signal COLUMN MODE, and outputs labeled COLUMN A and COLUMN B. Each of outputs COLUMN A and COLUMN B include a bit line pair in a memory array that is organized as illustrated in FIG. 2. Mode signal COLUMN MODE can be asserted as a logic zero "0" for selecting a single column for comparison, or a logic one "1" for selecting two columns for comparison with two other columns. Bit line multiplexer 79 receives a column address labeled COLUMN ADDRESS 1. One or two bit lines are selected depending on the COLUMN MODE.

FIG. 8 is a table of values illustrating the possible states of the bit line selection circuit 75 of FIG. 7. Note the table only specifically illustrates the operation of multiplexer 76 for selecting one or more bit lines to connect to one input of the comparator. The operation of multiplexer 79 for selecting the other bit line(s) is substantially the same. When mode signal COLUMN MODE is a logic zero, the top two rows of the table of FIG. 8 apply. A logic zero COLUMN ADDRESS will cause COLUMN A signal to be output to select one bit line of a bit line pair for comparison. A logic one COLUMN ADDRESS will cause COLUMN B selection signal to be output to select another one bit line of a bit line pair for comparison. When mode signal COLUMN MODE is a logic one, the bottom two rows of the table of FIG. 8 apply. If COLUMN ADDRESS is a logic zero, no bit lines are selected. If COLUMN ADDRESS is a logic one, both COLUMN A and COLUMN B signals are asserted and two bit lines are coupled together so that their currents are added together. Bit line selection circuit 75 is only one embodiment; other embodiments of a bit line selection circuit for selecting multiple word lines is possible. Also, like decoder 65, bit line selection circuit 75 may be extended to a multi-level structure as discussed above.

Figure 9:
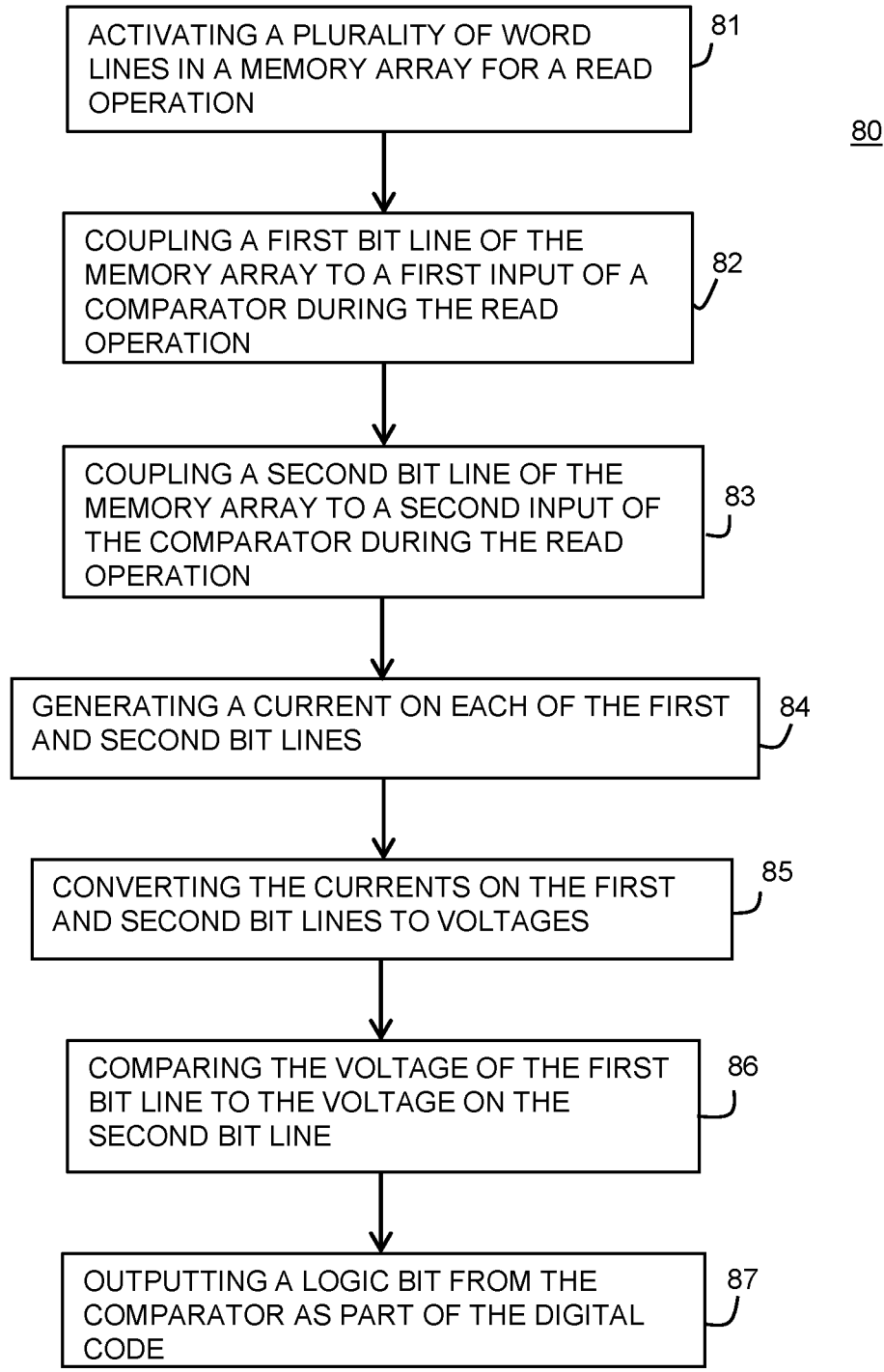
FIG. 9 is a flow chart of a method for generating a PUF response in accordance with an embodiment.

FIG. 9 is a flow chart of a method 80 for generating a PUF response in accordance with an embodiment. Method 80 is performed in a memory array similar to the memory array illustrated in FIG. 2. Prior to performing the steps set out in method 80, in one embodiment, the same logic state is written into each of the bit cells that can be used as a PUF response. Alternately, some other defined logic state is written into each of the bit cells such that the bit cells can be used as a PUF response. At step 81, a plurality of word lines is selected at the same time for a read operation so that multiple bit cells are connected at the same time to each corresponding bit line. A current is provided on the bit lines by the selected bit cells. At step 82, a first bit line is coupled to a first input of a comparator, such as comparator 36 in FIG. 2. At step 83, a second bit line is coupled to a second input of the comparator. The bit lines may be selected using a bit line selector 34 as described above and shown in FIG. 2. At step 84, a current is generated on the bit lines by the selected bit cells. At step 85, the generated current on the first and second bit lines is converted to a voltage. At step 86, the comparator compares the voltages on the first and second bit lines. At step 87, a logic bit having a logic value determined by the comparison is output as part of a digital code. The digital code may be used as part of a PUF response.

Implementing a PUF array with multiple word line selection to connect multiple memory cells to the inputs of a comparator during a read operation provides better noise immunity by increasing a difference between compared currents, as compared to a PUF array that does not connect multiple memory cells to the comparator. Also, by using a bit line selector that can select multiple different bit lines during a read operation provides a PUF with more responses, thus increasing the challenge-response space. Coupling multiple bit lines to each comparator input also serves to improve the noise immunity.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating a digital code, the method comprising:
    writing a same predetermined logic state to each bit cell of a memory array, wherein the memory array includes a plurality of bit cells, a plurality of word lines, and a plurality of bit line pairs, wherein each bit cell of the memory array is coupled to a bit line pair of the plurality of bit line pairs and each bit cell of the memory array is coupled to a word line of the plurality of word lines, wherein a bit line pair includes a true bit line and a complement bit line;
    activating at least two of the plurality of word lines at the same time in the memory array;
    coupling a first bit line of the memory array to a first input of a comparator;
    coupling a second bit line of the memory array to a second input of the comparator, the second bit line is coupled to different bit cells than the first bit line;
    coupling a third bit line to the first bit line and coupling a fourth bit line to the second bit line, wherein each of the first, second, third, and fourth bit lines are all either one of a true bit line or a complement bit line;
    generating a signal on each of the first, second, third, and fourth bit lines at the same time during a read operation;
    comparing the signal on the first bit line and third bit line to the signal on the second bit line and fourth bit line; and
    outputting a single logic bit from the comparator as part of the digital code, a logic state of the logic bit determined in response to the comparison, wherein activating the plurality of word lines at the same time couples multiple bit cells to each of the first and second bit lines to output the logic bit.

2. The method of claim 1, wherein the memory array comprises a physically unclonable function (PUF) and outputting the logic bit is a PUF response.

3. The method of claim 1, wherein the memory array is characterized as being a static random-access memory array.

4. The method of claim 1, wherein activating the plurality of word lines further comprises enabling a decoder to select the plurality of word lines at the same time for the read operation.

5. The method of claim 1, wherein each of the first and second bit lines is one bit line of a bit line pair.

6. The method of claim 1, wherein the method is performed using an integrated circuit memory array.

7. The method of claim 1, wherein generating a signal on each of the first, second, third, and fourth bit lines further comprises generating a current on each of the first, second, third, and fourth bit lines in response to activating the at least two of the plurality of word lines, and wherein comparing the signal on each of the first, second, third, and fourth bit lines further comprises first converting the current to a voltage using a resistance coupled to each of the first, second, third, and fourth bit lines and comparing the voltages.

8. The method of claim 1, wherein activating the plurality of word lines further comprises enabling a word line driver multiplexer to activate the at least two word lines at the same time during the read operation.

9. In a memory array comprising a plurality of memory cells organized as intersecting rows and columns, a row comprising a word line and all the memory cells coupled to the word line, and a column comprising a bit line pair and all the memory cells coupled to the bit line pair, a method for generating a digital code, the method comprising:
    writing a same predetermined logic state to all the plurality of memory cells;
    activating a plurality of word lines in the memory array at the same time to couple multiple memory cells to a bit line of the bit line pair, wherein the bit line pair includes a true bit line and a complement bit line;
    coupling a first bit line of the memory array to a first input of a comparator;
    coupling a second bit line of the memory array to a second input of the comparator, wherein the second bit line is from a different column than the first bit line;
    coupling a third bit line to the first bit line and coupling a fourth bit line to the second bit line of the one logic bit, wherein each of the first, second, third, and fourth bit lines are all either one of a true bit line or a complement bit line;
    generating a current on each of the first, second, third, and fourth bit lines, wherein the current on each of the first, second, third, and fourth bit lines is provided by the multiple memory cells coupled to each of the first, second, third, and fourth bit lines at the same time during the read operation;
    converting the currents on the first, second, third, and fourth bit lines to voltages;

using the comparator, comparing the voltage on the first bit line and third bit line to the voltage on the second bit line and fourth bit line; and outputting the one logic bit from the comparator as part of the digital code, a logic state of the one logic bit determined in response to the comparison of the voltage on the first bit line and third bit line to the voltage on the second bit line and fourth bit line.

10. The method of claim 9, wherein the plurality of memory cells is characterized as being a plurality of static random-access memory cells.

11. The method of claim 9, wherein the digital code is used as a physically unclonable function (PUF) response.

12. The method of claim 9, wherein converting the currents on the first, second, third, and fourth bit lines further comprises further comprises converting the current to a voltage using a resistance coupled to each of the first, second, third, and fourth bit lines.

13. The method of claim 9, wherein the memory array is implemented on an integrated circuit.

14. The method of claim 9, further comprising coupling the plurality of bit lines to a bit line selection circuit, the bit line selection circuit for coupling a predetermined number of bit lines together in response to a mode signal, wherein during a single read operation of the memory array, multiple bit lines are coupled to each input of the comparator at the same time.

15. A data processing system comprising:

a processor;

a memory array coupled to the processor, the memory array including a plurality of memory cells, a plurality of word lines, and a plurality of bit line pairs intersecting the plurality of word lines, wherein a memory cell of the plurality of memory cells is located at each intersection of the plurality of word lines and the plurality of bit line pairs, and wherein each of the plurality of bit line pairs includes a true bit line and a complement bit line;

a word line driver multiplexer coupled to the plurality of word lines, the word line driver multiplexer selecting at least two word lines at the same time to couple multiple memory cells to a bit line for a read operation of one bit in response to a row address;

a bit line selection circuit coupled to the plurality of bit line pairs, the bit line selection circuit for selecting a first bit line of a first bit line pair and a second bit line of a second bit line pair in response to a column address, wherein the second bit line is coupled to different memory cells than the first bit line, wherein the bit line selection circuit further comprises a mode for coupling a third bit line of a third bit line pair to the first bit line and coupling a fourth bit line of a fourth bit line pair to the second bit line at the same time during the read operation of the one bit, wherein a signal generated on each of the first, second, third, and fourth bit lines is provided by multiple memory cells coupled to each of the first, second, third, and fourth bit lines in response to the at least two word lines being selected at the same time, and wherein each of the first, second, third, and fourth bit lines are all either one of a true bit line or a complement bit line; and a comparator for comparing a difference between the signal generated on the first and third bit lines to the signal generated on the second and fourth bit lines, and the comparator for outputting the bit having a logic state representative of the difference.

16. The data processing system of claim 15, wherein the data processing system is implemented on one or more integrated circuit devices.

17. The data processing system of claim 15, wherein the outputted logic state is part of a physically unclonable function (PUF) response.

18. The data processing system of claim 15, wherein the plurality of memory cells is a plurality of static random-access memory cells.

* * * * *